Patented Mar. 23, 1926.

1,577,890

UNITED STATES PATENT OFFICE.

CLINTON D. ABRAHAM, DECEASED, LATE OF WILMINGTON, DELAWARE; BY CHESTER H. ROSS, ADMINISTRATOR, OF WILMINGTON, DELAWARE, ASSIGNOR TO E. I. DU PONT DE NEMOURS & COMPANY, OF WILMINGTON, DELAWARE, A CORPORATION OF DELAWARE.

BRATTICE SHEETING.

No Drawing.    Application filed June 25, 1921. Serial No. 480,430.

*To all whom it may concern:*

Be it known that CLINTON D. ABRAHAM, late a citizen of the United States, and a resident of Wilmington, in the county of New Castle and State of Delaware, deceased, has invented a certain new and useful Brattice Sheeting, of which the following is a specification.

This invention relates to brattice sheeting, and comprises a fireproofed fabric coated with a rubber composition capable of resisting the action of fungi and moisture or dilute acids.

Brattice sheeting is extensively used in mines for the purpose of controlling and directing air currents and preventing the spread of fires. This material must be resistant to fire and also to a fungus growth which causes rapid deterioration of unprotected cotton fabric. The fungus thrives under the conditions of high humidity and darkness which exist in the mines.

The material used as brattice sheeting consists of a suitable fabric, such as duck, drill or Osnaburg, properly treated to render it fire resistant and then impregnated and coated with a suitable composition possessing fungus-resisting properties.

A suitable coating composition may be made by combining (1) rubber, (2) a fungicidal material as, for example, pine tar and coal tar, (3) mineral rubber (natural bitumen or asphalt) and, if desired, (4) various inorganic fire-resistant compounds or fillers such as whiting, barytes, etc. The proportions which are considered preferable are given in the following formulæ:—

| Parts by weight. | I. | II. |
|---|---|---|
| Rubber | 80 to 90 | 83 | 87 |
| Mineral rubber | 5.5 to 15 | 9 | 5.5 |
| Coal tar | 3 to 8 | 3 | 5 |
| Whiting (CaCO₃) | 10 to 30 | 23 | 22 |

The rubber used is preferably a high grade uncured rubber, but may consist in part of reclaimed rubber.

The fabric may be rendered fire resistant, before the rubber composition is applied, by any of the standard methods for fireproofing. In the case of this particular material very satisfactory results have been obtained by saturating the fabric with a 25% water solution of ammonium dihydrogen phosphate (commercial phosphate of ammonia) and drying in any suitable manner. Instead of ammonium dihydrogen phosphate, ammonium magnesium phosphate may be used.

The impregnation and subsequent operations in making the finished material are carried out as follows:

The coating composition is dissolved in an equal weight of gasoline to yield a cement containing 50% non-volatile materials. The fireproofed fabric is impregnated with this cement by means of a suitable impregnating machine. After impregnation, spread coats are applied until a suitable weight of coating has been obtained, using the ordinary type of rubber roll spreader. The material is then finished on both sides with French talc. It is neither necessary nor desirable to vulcanize the coated material, the proper protection and consequent satisfactory service being obtained with the rubber in the uncured state.

It will be understood that various changes not specifically described above may be made in the invention without departing from the spirit or scope thereof.

What is claimed is:—

1. As a new article of manufacture, brattice sheeting consisting of a fireproofed fabric provided with a coating comprising 80 to 90 parts of rubber, from about 3 to 8 parts of coal tar, and from about 5 to 15 parts of natural bitumen.

2. As a new article of manufacture, brattice sheeting consisting of a fireproofed fabric thoroughly impregnated and coated on both sides with a rubber composition containing coal tar and natural bitumen.

3. As a new article of manufacture, brattice sheeting consisting of a fireproofed fabric thoroughly impregnated and coated on both sides with a composition comprising 80 to 90 parts of rubber, from about 3 to 8 parts of coal tar, and from about 5 to 15 parts of natural bitumen.

4. As a new article of manufacture, brattice sheeting consisting of a fireproofed fabric thoroughly impregnated and coated on both sides with a composition comprising 80 to 90 parts of rubber at least part of which is unvulcanized, from about 3 to 8 parts of coal tar, from about 5 to 15 parts of natural bitumen, and from about 10 to 30 parts of a fire-resistant material.

5. As a new article of manufacture, brattice sheeting consisting of a fabric whose fibers are impregnated with an ammonium phosphate to render them fireproof, said fabric having on both sides a strongly adherent coating comprising a high grade rubber, coal tar and natural bitumen.

6. As a new article of manufacture, brattice sheeting consisting of a fabric whose fibers are impregnated with an ammonium phosphate to render them fireproof, said fabric having on both sides a strongly adherent coating comprising a high grade unvulcanized rubber, coal tar and natural bitumen.

7. As a new article of manufacture, brattice sheeting comprising a fabric impregnated and coated with unvulcanized rubber and coal tar.

In testimony whereof I affix my signature.

CHESTER H. ROSS,
*Administrator of the Estate of Clinton D. Abraham, deceased.*